(12) United States Patent
Al-Duwaish et al.

(10) Patent No.: US 8,346,693 B2
(45) Date of Patent: *Jan. 1, 2013

(54) METHOD FOR HAMMERSTEIN MODELING OF STEAM GENERATOR PLANT

(75) Inventors: Hussain N. Al-Duwaish, Dhahran (SA); Syed Z. Rizvi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 557 days.

This patent is subject to a terminal disclaimer.

(21) Appl. No.: 12/591,606

(22) Filed: Nov. 24, 2009

(65) Prior Publication Data

US 2011/0125687 A1    May 26, 2011

(51) Int. Cl.
  G06E 1/00    (2006.01)
  G06E 3/00    (2006.01)
  G06F 15/18   (2006.01)
  G06G 7/00    (2006.01)

(52) U.S. Cl. ............... 706/21; 706/45; 706/46; 706/47; 706/62; 700/28; 700/29; 700/30; 700/47

(58) Field of Classification Search ............... None
  See application file for complete search history.

(56) References Cited

U.S. PATENT DOCUMENTS

| | | | |
|---|---|---|---|
| 3,955,359 A | 5/1976 | Yannone et al. | |
| 6,098,010 A | 8/2000 | Krener et al. | |
| 6,360,131 B1 | 3/2002 | Cheng | |
| 6,516,309 B1 | 2/2003 | Eberhart et al. | |
| 7,050,866 B2 | 5/2006 | Martin et al. | |
| 7,885,797 B2 * | 2/2011 | Koppl et al. | 703/13 |
| 2003/0018399 A1 * | 1/2003 | Havener et al. | 700/28 |
| 2007/0055392 A1 | 3/2007 | D'Amato et al. | |
| 2007/0142975 A1 | 6/2007 | Piche | |
| 2007/0156288 A1 | 7/2007 | Wroblewski et al. | |
| 2008/0053348 A1 | 3/2008 | Bardi et al. | |
| 2008/0071395 A1 | 3/2008 | Pachner | |
| 2008/0071397 A1 * | 3/2008 | Rawlings et al. | 700/53 |
| 2008/0208778 A1 * | 8/2008 | Sayyar-Rodsari et al. | 706/12 |
| 2008/0293372 A1 * | 11/2008 | Principe et al. | 455/334 |
| 2009/0012653 A1 | 1/2009 | Cheng et al. | |
| 2009/0177291 A1 * | 7/2009 | Boe et al. | 700/29 |

FOREIGN PATENT DOCUMENTS

WO    WO2007070220 A2    6/2007

OTHER PUBLICATIONS

Van Overschee et al. "N4SID: Subspace algorithms for the identification of combined deterministic-stochastic systems", Automatica, special issue on statistical processing and control, 1992, pp. 1-50.*

(Continued)

*Primary Examiner* — Omar Fernandez Rivas
(74) *Attorney, Agent, or Firm* — Richard C. Litman

(57) ABSTRACT

The method for Hammerstein modeling of a steam generator plant includes modeling of the linear dynamic part of a Hammerstein model with a state-space model, and modeling the nonlinear part of the Hammerstein model with a radial basis function neural network (RBFNN). Particle swarm optimization (PSO), typically known for its heuristic search capabilities, is used for estimating the parameters of the RBFNN. Parameters of the linear part are estimated using a numerical algorithm for subspace state-space system identification (N4SID).

7 Claims, 7 Drawing Sheets

OTHER PUBLICATIONS

Giri et al. "Hammerstein model identification" Proceedings fof the 10th mediterranean conference on control and automation, 2002, 9 pages.*

Gomez et al. "Subspace identification of multivariable hammerstein and wiener models", IFAC, 2002, 6 pages.*

Kennedy et al. "Particle swarm optimization", IEEE, 1995, pp. 1942-1948.*

Al-Duwaish et al. "Use of multilayer feedforward neural networks in identification and control of wiener model", IEEE, 1996, pp. 255-258.*

Nelles et al. "Identification of non-linear dynamic systems-Classical methods versus radial basis function networks", Proceedings of the american control conference, 1996, pp. 3786-3790.*

Naitali et al. "Hammerstein and Wiener nonlinear models identification using multimodal particel swarm optimizer" Proceedings of the 2006 American control conference, 2006, pp. 2363-2368.*

Lin et al. "A mew identification method for Hammerstein model based on PSO", IEEE, 2006, pp. 2184-2188.*

Liu et al. "Nonlinear system identification of Hammerstein and Wiener model using swarm intelligence", IEEE, 2006, pp. 1219-1223.*

Hou, "Hammerstein model identification based on adaptive particle swarm optimization", Workshop on intelligent information technology application, 2007, pp. 137-140.*

Salahshoor et al., "A new on-line subspace-based identification algorithm for multivariable Hammerstein models", IEEE, 2008, pp. 4748-4753.*

* cited by examiner

METHOD FOR HAMMERSTEIN MODELING OF STEAM GENERATOR PLANT

BACKGROUND OF THE INVENTION

1. Field of the Invention

The present invention relates to computerized mathematical model for engineering purposes, and particularly to a method for Hammerstein modeling of a steam generator plant.

2. Description of the Related Art

The Hammerstein model belongs to a family of block-oriented models, and is made up of a memoryless nonlinear part followed by a linear dynamic part. It has been known to effectively represent and approximate several industrial processes, such as pH neutralization processes, distillation column processes, and heat exchange processes. Hammerstein models have also been used to successfully model nonlinear filters, biological systems, water heaters, and electrical drives.

A significant amount of research has been carried out on identification of Hammerstein models. Systems can be modeled by employing either nonparametric or parametric models. Nonparametric representations involve kernel regression or expansion of series, such as the Volterra series. This results in a theoretically infinite number of model parameters, and is therefore represented in terms of curves, such as step responses or bode diagrams. Parametric representations, such as state-space models, are more compact, as they have fewer parameters and the nonlinearity is expressed as a linear combination of finite and known functions.

Development of nonlinear models is the critical step in the application of nonlinear model based control strategies. Nonlinear behavior is prominent in the dynamic behavior of physical systems. Most physical devices have nonlinear characteristics outside a limited linear range. In most chemical processes, for example, understanding the nonlinear characteristics is important for designing controllers that regulate the process. It is rather difficult, yet necessary, to select a reasonable structure for the nonlinear model to capture the process nonlinearities. The nonlinear model used for control purposes should be as simple as possible, warranting minimal computational load and, at the same time, retaining most of the nonlinear dynamic characteristics of the system. The following convention has been used in what follows: upper case variables in bold represent matrices, lower case bold variables represent vectors, and lower case regular (i.e., non-bold) variables represent scalar quantities.

Many model structures have been proposed for the identification of nonlinear systems. The nonlinear static block followed by a dynamic block in the Hammerstein structure has been found to be a simple and effective representation for capturing the dynamics of typical chemical engineering processes such as distillation columns and heat exchangers, for example. Nonlinear system identification involves the following tasks: Structure selection, including selection of suitable nonlinear model structures and the number of model parameters; input sequence design, including the determination of the input sequence u(t) which is injected into the system to generate the output sequence y(t); noise modeling, which includes the determination of the dynamic model which generates the noise input w(t); parameter estimation, which includes estimation of the remaining model parameters from the dynamic system data u(t) and y(t), and the noise input w(t); and model validation, including the comparison of system data and model predictions for data not used in model development.

Hammerstein systems can be modeled by employing either nonparametric or parametric models. Nonparametric models represent the system in terms of curves resulting from expansion of series, such as the Volterra series or kernel regression. In practice, these curves are sampled, often leading to a large number of parameters. Parametric representations, such as state-space models, are more compact and have fewer parameters, while the nonlinearity is expressed as a linear combination of finite and known functions.

In the MIMO Hammerstein model, as noted above, a nonlinear system is represented as a nonlinear memory-less subsystem f(.), followed by a linear dynamic part. The input sequence u(t) and the output sequence y(t) are accessible to measurements, but the intermediate signal sequence v(t) is not. As shown in FIG. 1B, the static nonlinear element scales the inputs u(t) and transforms these inputs to v(t) through a nonlinear arbitrary function f(u). The dynamics of the system are modeled by a linear transfer function, whose outputs are y(t).

Many different techniques have been proposed for the black-box estimation of Hammerstein systems from input-output measurements. These techniques mainly differ in the way that static nonlinearity is represented and in the type of optimization problem that is finally obtained. In parametric approaches, the static nonlinearity is expressed in a finite number of parameters. Both iterative and non-iterative methods have been used for determination of the parameters of the static-nonlinear and linear-dynamic parts of the model. Typical techniques, however, are extremely costly in terms of computational time and energy.

Additionally, most techniques designed to deal with Hammerstein models focus purely on single-input single-output (SISO) models. Identification of MIMO systems, however, is a problem which has not been well explored. Identification based on prediction error methods (PEM), for example, is a complicated function of the system parameters, and has to be solved by iterative descent methods, which may get stuck into local minima. Further, optimization methods need an initial estimate for a canonical parametrization model; i.e. models with minimal numbers of parameters, which might not be easy to provide.

A typical steam generator plant may be identified as, or modeled with, a Hammerstein model. A typical steam generator plant is the Abbott Power Plant in Campaign, Ill. This plant is a dual fuel (oil/gas) fired unit used for heating and generating electric power. The plant has four inputs, namely fuel flow rate (scaled 0-1), air flow rate (scaled 0-1), water flow (inches), and steam demand disturbance (scaled 0-1), along with four outputs, namely drum pressure (psi), excess oxygen in exhaust gases (0-100%), water level in the drum (inches), and steam flow (kg/s). The plant is rated at 22.096 kg/s of steam at 22.4 MPa (325 psi) of pressure. The plant has dynamics of high order, as well as nonlinearities, instabilities, and time delays. FIG. 2 illustrates an overview of such a plant. In FIG. 2, $u_3$ represents feed water flow, controlled by a suitable valve. Similarly, $u_1$ represents fuel flow with a regulated rate, flowing across a burner within the furnace. $y_1$ represents pressurized steam from a steam drum or the like with measured and regulated steam flow rate $y_4$. The drum positioned beneath the steam drum may be a mud drum or the like. $y_2$ represents measured excess oxygen, which is measured at the induced draft fan and a forced draft fan (the induced draft fan is shown as being above the forced draft fan in FIG. 2, though it should be understood that this is purely diagrammatic and representational). Further, $u_2$ represents regulated and measured air flow and $y_3$ represents the water level.

Apart from these measurable and deterministic outputs and inputs, there are certain disturbances in the plant, such as changes in steam demand by users and sensor noise, and certain uncertainties which include fuel calorific value variations, heat transfer coefficient variations, and distributed dynamics of steam generation. The plant also has few constraints, such as actuator constraints, unidirectional flow rates and drum flooding.

While models based on first principles and physical laws are available, a limited amount of work on steam and boiler modeling based on system identification exists. It would be desirable to be able to obtain a nonlinear model of steam generator plant directly from test data using the methods of system identification.

It has been shown that the minimal parametrization described above can lead to several problems. PEM have, therefore, inherent difficulties with MIMO system identification. More recent studies have also shown that maximum likelihood criterion results in a non-convex optimization problem in which global optimization is not guaranteed. Subspace identification methods (SIM) do not need nonlinear optimization techniques, nor do these methods need to impose to the system a canonical form. Subspace methods therefore do not suffer from the inconveniences encountered in applying PEM methods to MIMO system identification. Thus, it would be desirable to make use of this advantage, modeling the linear dynamic subsystem of the Hammerstein model with a state-space model rather than polynomial models. Thus, a method for Hammerstein modeling of a steam generator plant solving the aforementioned problems is desired.

SUMMARY OF THE INVENTION

The method for Hammerstein modeling of a steam generator plant includes modeling of the linear dynamic part of a Hammerstein model with a state-space model, and modeling the nonlinear part of the Hammerstein model with a radial basis function neural network (RBFNN). Accurate identification of a Hammerstein model requires that output error between the actual and estimated systems be minimized. Thus, the problem of identification is, in essence, an optimization problem. The particle swarm optimization (PSO) subspace algorithm is an optimization algorithm. Particle swarm optimization (PSO), typically known for its heuristic search capabilities, is used for estimating the parameters of the RBFNN. Parameters of the linear part are estimated using a numerical algorithm for subspace state-space system identification (N4SID).

The method includes the following steps: (a) acquiring an initial set of nonlinear Hammerstein system data from a steam generation plant; (b) estimating a set of state-space matrices A, B, C, and D from the initial set of nonlinear Hammerstein system data acquired from the steam generation plant using subspace identification; (c) randomly initializing a swarm of particles with a population formed of possible radial basis function neural network weights; (d) calculating a global best set of weights that minimizes an output error measure; (e) estimating sets of radial basis function neural network outputs v(t) for all values of t based upon the global best set of weights; (f) estimating the state-space matrices A, B, C and D from the radial basis function neural network outputs v(t) for all values of t, estimated in step (e), and sets of original system outputs y(t) for all values of t, (g) calculating sets of system outputs ŷ(t) for all values of t from the estimated state-space matrices A, B, C and D of step (f); (h) calculating the output error measure; and (i) repeating steps (c) to (h) if the calculated output error measure is greater than a preselected threshold error measure.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
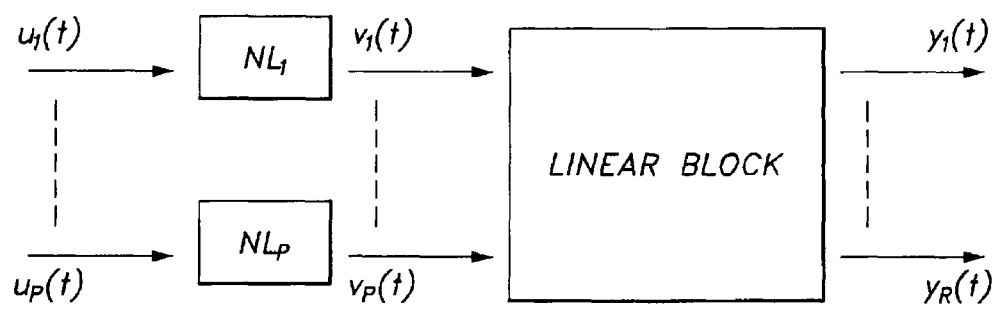
FIG. 1A is a diagrammatic representation of a Hammerstein model with separate nonlinearities.

The method for Hammerstein modeling of a steam generator plant includes modeling of the linear dynamic part of a Hammerstein model with a state-space model, and modeling the nonlinear part of the Hammerstein model with a radial basis function neural network (RBFNN). Accurate identification of a Hammerstein model requires that output error between the actual and estimated systems be minimized. Thus, the problem of identification is, in essence, an optimization problem. The particle swarm optimization (PSO) subspace algorithm is an optimization algorithm. Particle swarm optimization (PSO ), typically known for its heuristic search capabilities, is used for estimating the parameters of the RBFNN. Parameters of the linear part are estimated using a numerical algorithm for subspace state-space system identification (N4SID).

As noted above, the linear dynamic part of the Hammerstein model is modeled by a state-space model. The static nonlinear part of the Hammerstein model is modeled using RBFNN. The external inputs to the system u(t) are fed to the RBFNN. The output generated by RBFNN v(t) acts as the input to the state-space system, which translates the inputs to system outputs y(t). The intermediate data between the nonlinear and linear parts is inaccessible to measurements.

Particularly, considering a MIMO Hammerstein system with p inputs and r outputs, the input layer of the RBFNN takes the system inputs $u(t)=[u_1(t) \ldots u_p(t)]^T$ and the second layer of the RBFNN, referred to as the "hidden layer", performs a fixed nonlinear transformation on this data using the basis function $\phi$. The output layer of the RBFNN then implements a linear weightage and supplies the response of the network to the output $v(t)=[v_1(t) \ldots v_p(t)]^T$. Thus, the only adjustable parameters in the RBFNN are the weights of its output layer. This output, $v(t)$ is fed to the linear subsystem whose output is given by:

$$x(t+1)=Ax(t)+Bv(t)+s(t) \quad (1)$$

$$\hat{y}(t)=Cx(t)+Dv(t)+z(t) \quad (2)$$

where $v(t) \in \Re^{P \times 1}$ and $\hat{Y}(t) \in \Re^{R \times 1}$ are the vectors for p inputs and r outputs of the linear subsystem observed at discrete time instant t. Vector $z(t) \in \Re^{R \times 1}$ is called the measurement noise and $s(t) \in \Re^{n \times 1}$ is called the process noise, where n denotes the order of the linear subsystem. Both $z(t)$ and $s(t)$ are zero mean, white noise sequences, which have covariance matrices given by:

$$E\left[\begin{pmatrix} s \\ z \end{pmatrix}(s^T \ z^T)\right] = \begin{bmatrix} Q & S \\ S^T & r \end{bmatrix}\delta_{pq} \quad (3)$$

where E denotes expected value and $\delta_{pq}$ denotes a Kronecker delta function.

Accurate identification of a Hammerstein model requires that the error between the outputs of the actual and estimated systems be minimized. If $y(t)=[y_1(t) \ldots y_r(t)]^T$ denotes the vector for original outputs of the sampled data, and $\hat{y}(t)=[\hat{y}_1(t) \ldots \hat{y}_r(t)]^T$ denotes the vector for the outputs of the estimated system, then a cost function based on the square of the output error is sought to be minimized, with the cost function being given by:

$$I = \sum_{t=1}^{N} e^T(t)e(t) \quad (4)$$

where N denotes the number of data points, $e(t)=[e_1(t) \ldots e_r(t)]^T$ is the vector for output error at discrete time instant t, and is given by $e(t)=Y(t)-\hat{Y}(t)$.

The PSO plays a large part in training the RBFNN. In a swarm of particles, where each particle represents a candidate value for the weight of RBFNN output layer, the fitness of the particles is the reciprocal of the cost index given in equation (4). Hence, the smaller the sum of output errors, the more fit are the particles. Based on this principle, the PSO updates the position of all the particles moving towards an optimal solution for the weights of RBFNN.

Hammerstein identification is, therefore, solved as an optimization problem in which PSO is used to estimate the parameters of RBFNN, while parameters of the linear subsystem are estimated using the N4SID numerical subspace algorithm. RBFNN is an effective type of neural network that has proved useful in applications such as function approximation and pattern recognition. It should be noted that the static nonlinearity in a MIMO Hammerstein model can be either combined or separate.

Figure 1B:
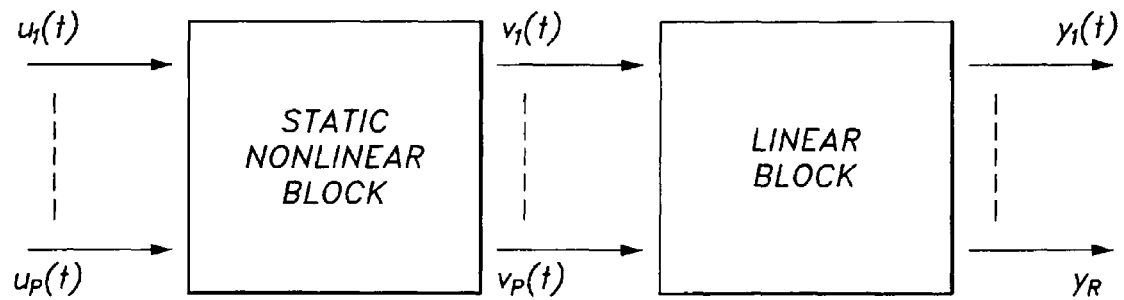
FIG. 1B is a diagrammatic representation of a Hammerstein model with combined nonlinearities.
Figure 2:
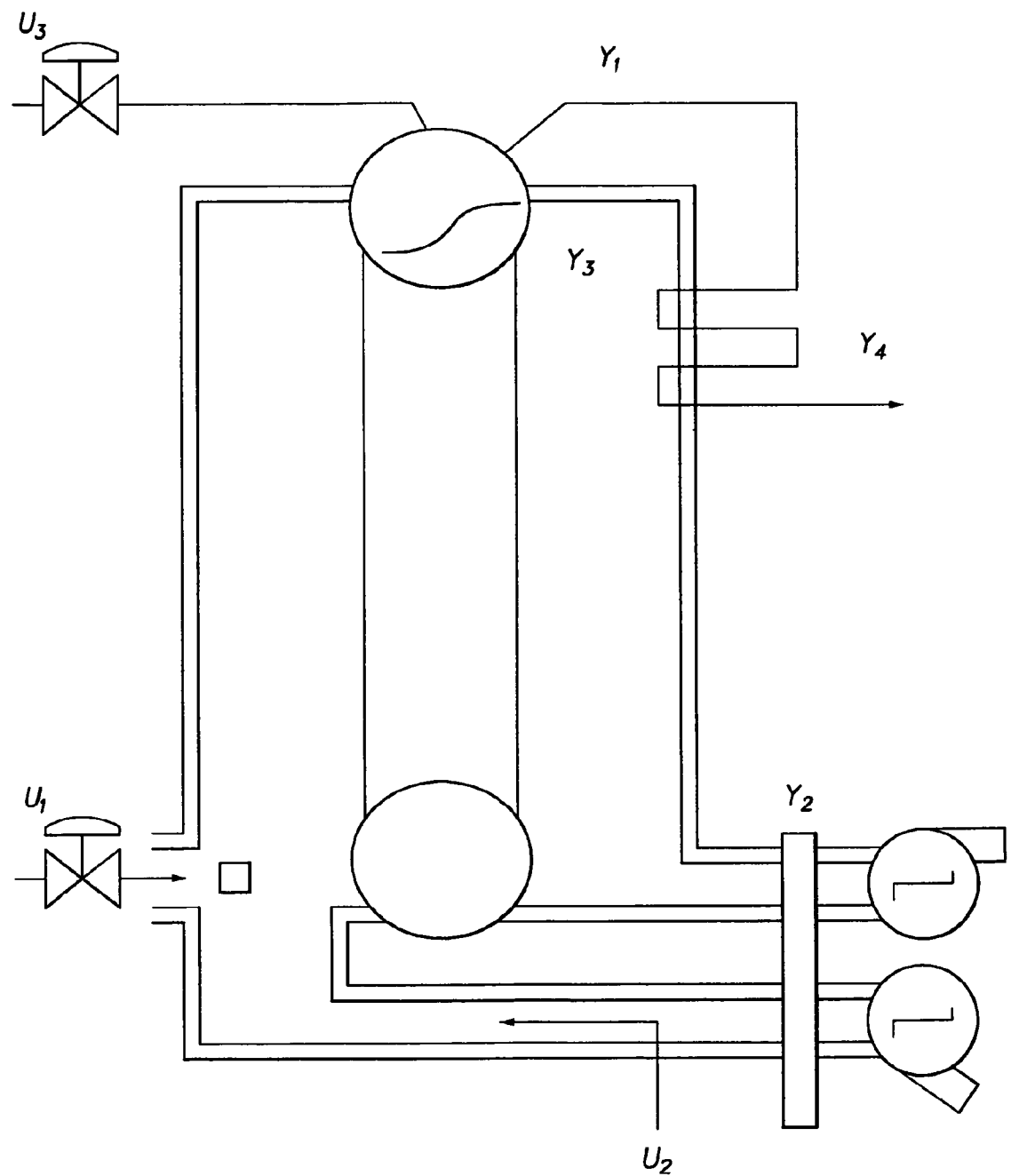
FIG. 2 is a schematic diagram of an exemplary industrial steam generator plant.
Figure 3:
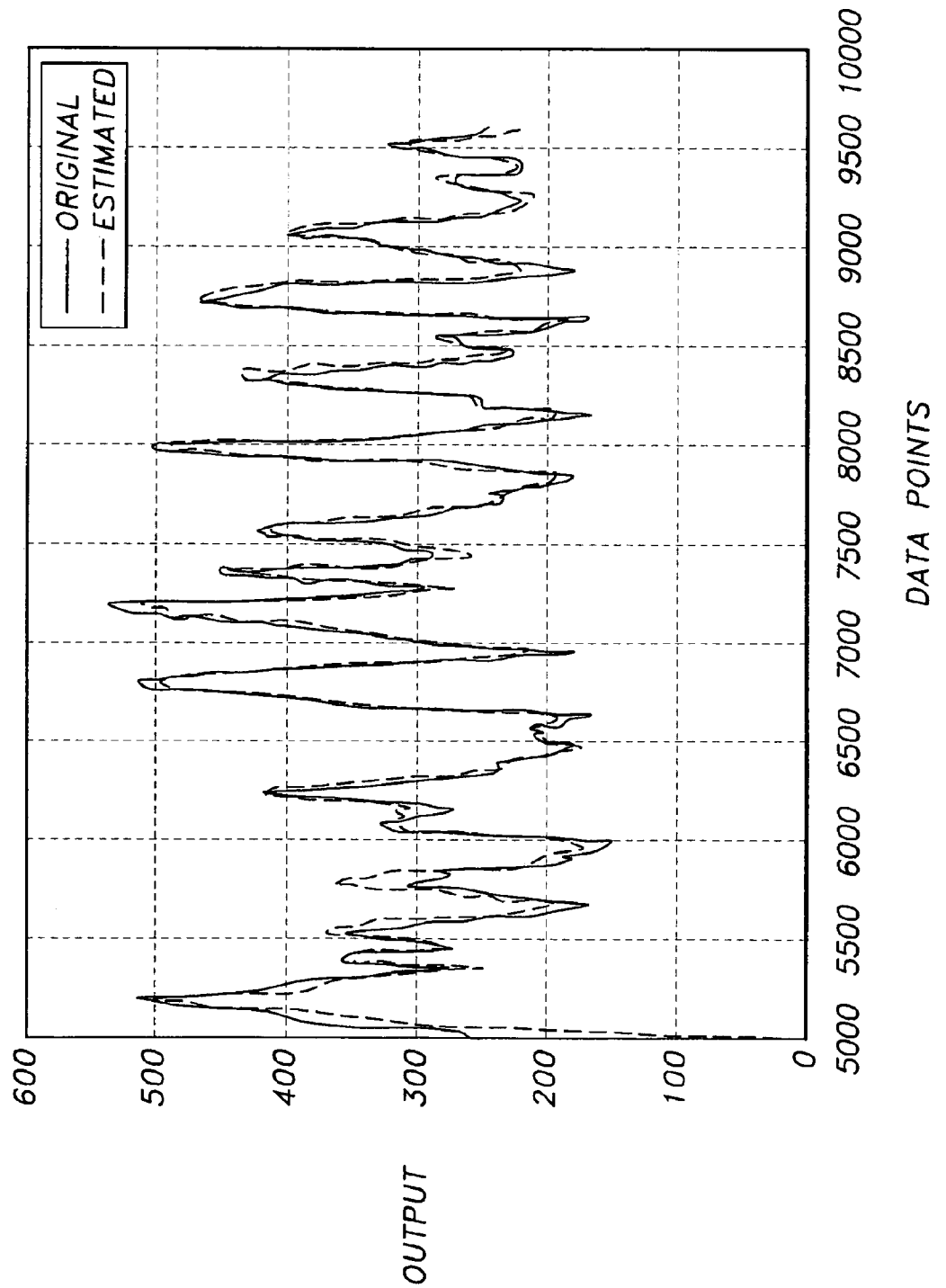
FIG. 3 is a graph illustrating measured output drum pressure of a steam generator plant vs. predicted output drum pressure calculated by the method for Hammerstein modeling of a steam generator plant according to the present invention.

FIGS. 1A and 1B show two Hammerstein models, both having p inputs and r outputs. In the system of FIG. 1A, each input to the linear subsystem is a function of a separate nonlinear function. Every nonlinearity is therefore approximated by a separate RBF network. FIG. 3 illustrates an RBFNN with three layers having Q neurons in the hidden layer. The input layer connects the network to its environment. The second layer performs a fixed nonlinear transformation using basis functions. The output layer linearly weighs the response of the network to the output. Thus, the $j^{th}$ nonlinear output $v_j(t)$ would depend only on $u_j(t)$, and would be modeled by the RBFNN as:

$$v_j(t)=\sum_{i=1}^{Q} w_i \phi \|u_j(t)-c_i\| \quad (5)$$

where Q is the number of neurons in the hidden layer, $c_i$ is the center for the $i^{th}$ neuron of that layer, $w_i$ is the weight connecting the $i^{th}$ neuron node to the output layer, $\phi$ is the radial basis function, and $\|.\|$ denotes the norm.

In the second system of FIG. 1B, the nonlinearity is combined, and therefore the effect of all the inputs is reflected over every nonlinear output $v_j(t)$. For a similar network having Q neurons in the hidden layer, the equation for the $j^{th}$ nonlinear output $v_j(t)$ in this case is given by:

$$v_j(t) = \sum_{i=1}^{Q} w_{ij}\phi\|u(t) - c_i\| \quad (6)$$

where $u(t) \in \Re^{p \times 1}$ is the input vector for the system shown in FIG. 1B at discrete time t.

Subspace identification is used for estimating the parameters of the linear dynamic part of the model; i.e., the matrices of the state-space model. The present inventive method makes use of the N4SID numerical algorithm. The objective of the algorithm is to determine the order n of the system, and the system matrices $A \in \Re^{n \times n}$, $B \in \Re^{n \times P}$, $C \in \Re^{R \times r}$, $D \in \Re^{R \times P}$, $Q \in \Re^{n \times n}$, $R \in \Re^{R \times R}$, and $S \in \Re^{n \times R}$ (and the Kalman gain matrix K if required), without any prior knowledge of the structure of the system. This is achieved in two main steps: First, model order n and a Kalman filter state sequence of estimates $\hat{x}_i, \hat{x}_{i+i}, \ldots, \hat{x}_{i+j}$ are determined by projecting row spaces of data block Hankel matrices, and then applying a singular value decomposition. Next, the solution of a least squares problem is used to obtain the state space matrices A, B, C, and D.

PSO is a heuristic search-based optimzation technique which exhibits behavior of swarm intelligence. PSO differs from other evolutionary algorithms (EAs) in that it changes its population from one iteration to the next. Unlike genetic algorithms (GAs) and other EAs, operators like selection, mutation and crossover are not used to change the population. Existing particles are, instead, modified according to a pair of formulae. PSO thus differs from other EAs in terms of performance. PSO is more robust and faster in comparison, and also provides solutions to complex and nonlinear problems, with relative ease in finding a global minimum. The convergence characteristic of PSO is relatively stable and provides solutions in relatively little time.

PSO begins with a population of particles. Each particle adjusts its position according to its own experience, as well as by the experience of neighboring particles. Each particle is treated as a point in D-dimensional space. The $i^{th}$ particle is represented as:

$$X_i=(x_{i1},x_{i2},\ldots,x_{iD}) \quad (7)$$

and the best positions of the particles (the position giving the most optimum solution) are recorded as:

$$P_i=(p_{i1},p_{i2},\ldots,p_{iD}) \quad (8)$$

with the change in position (velocity) of each particle being given as:

$$V_i=(v_{i1},v_{i2},\ldots,v_{iD}) \quad (9)$$

where the velocity and positions of the particles are updated according to the following pair of equations:

$$V_i^{n+1}=V_i^n+c_1*r_{i1}^{n}*(P_i^n-X_i^n)+c_2*r_{i2}^{n}*(P_g^n-X_i^n) \quad (10a)$$

$$X_i^{n+1}=X_i^n+x*V_i^{n+1} \quad (10b)$$

where $c_1$ and $c_2$ are two positive real constants, the cognitive parameter and the social parameter, respectively. The value of $c_1$ signifies how much a particle trusts its past experiences, and how much it searches for solutions around the local best position, while the value of $c_2$ determines the swarm's attraction toward a global best position.

Higher values of $c_1$ and $c_2$ make the swarm able to react faster to changes, whereas lower values of these parameters make the swarm slower in changing neighborhoods of solutions. The method makes use of values such that $c_1>c_2$ and $c_1+c_2\leq 4$.

Introducing an inertia weight w and a constriction factor X, the update equations become:

$$V_i^{n+1}=X(wV_i^n+c_1*r_{i1}^{n}*(P_i^n-X_i^n)+c_2*r_{i2}^{n}*(P_g^n-X_i^n)) \quad (11a)$$

$$X_i^{n+1}=X_i^n+x*V_i^{n+1} \quad (11b)$$

where w is the inertial weight, and X is the constriction factor, which is used to limit the velocity and help better convergence. The value of $c_1$ signifies how much a particle trusts its past experiences, and how much it is attracted to a local best position while the value of $c_2$ determines the swarm's attraction towards a global best position.

The method relates to Hammerstein model identification, which, in essence, can be summarized as follows: Given a set of N noisy inputs $u(t)_{t=0}^{N-1}$ and outputs $y(t)_{t=0}^{N-1}$, find the weights of the RBFNN; and find the matrices of the state space model. Since the output y(t) is nonlinear in relation to the input u(t), the calculations are nontrivial. Thus, a recursive algorithm is utilized to update the weights of the neural network for each set of input and output data.

The method includes the following steps: (1) Estimation of state-space matrices A, B, C and D from original nonlinear data using N4SID subspace identification (i.e., an initial estimate); (2) initialization of PSO with random population of possible RBFNN weights; (3) obtaining a global best set of weights that minimizes the cost index given in equation (4); estimation of sets RBFNN outputs v(t) for all values of t once optimum weights are obtained; (5) estimation of state-space matrices A, B, C, and D from the new neural network outputs estimated in step (4) and sets of original system outputs y(t) for all values of t (this estimate of state-space model is an improvement on the previous estimate); (6) regeneration of sets of output AO for all values of t from the new estimate of the complete system; and (7) repetition of steps (2) to (6) if the minimum goal for cost is not reached.

In a model simulation, a data set for the plant containing 9,600 samples obtained at a sampling rate 3 seconds was taken, and from this set, 5,000 samples were used for training, while 4600 samples were left aside for validation. The Hammerstein model is assumed to have separate nonlinearities for the sake of convenience, and therefore a network of ten neurons was selected to learn each nonlinearity. The centers of the RBFNNs were uniformly distributed in the data intervals. The PSO/subspace method identified the boiler plant. The normalized mean squared error at the output reached a final minimum value within a few iterations.

Figure 4:
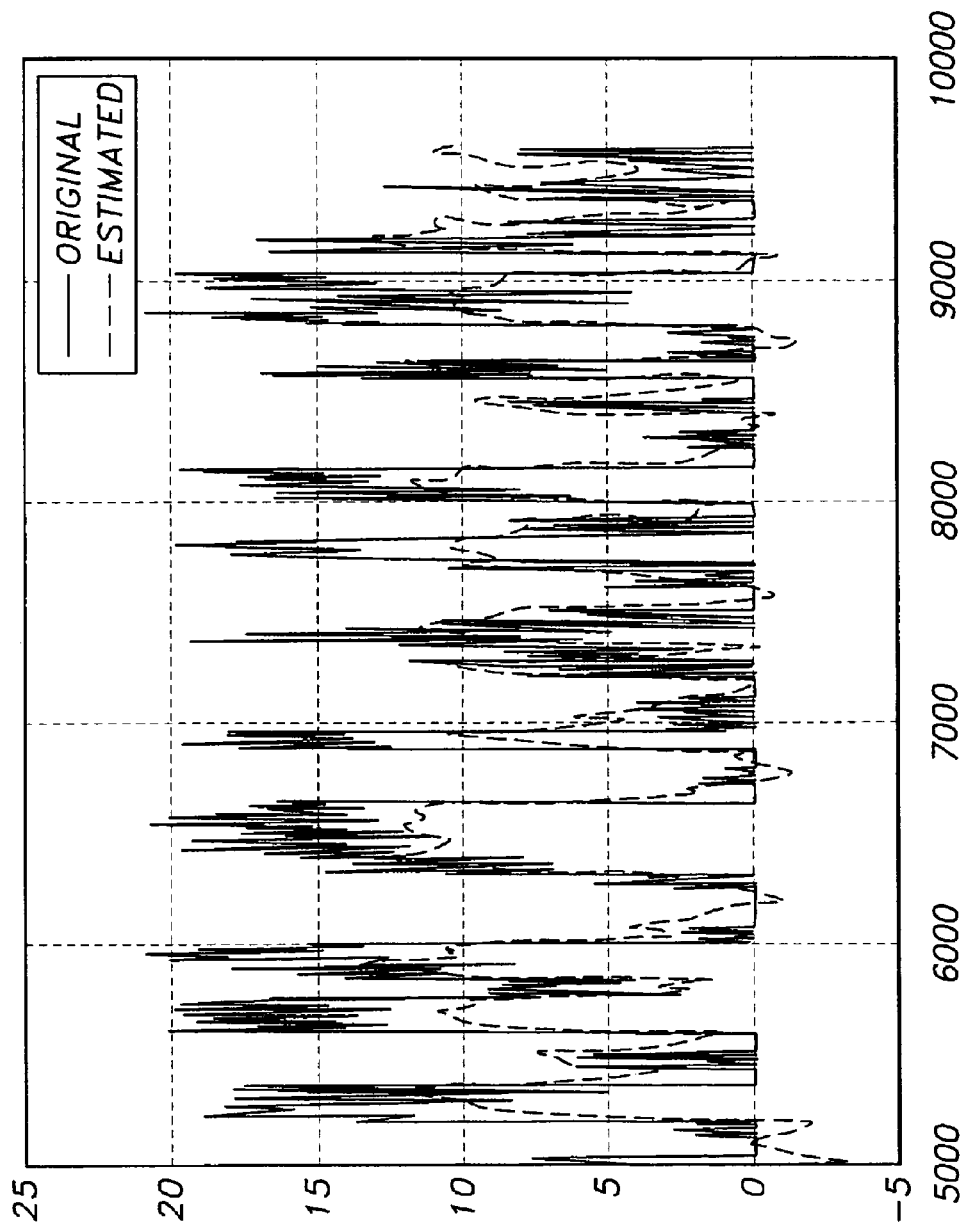
FIG. 4 is a graph illustrating measured output excess oxygen of a steam generator plant vs. predicted output drum pressure calculated by the method for Hammerstein modeling of a steam generator plant according to the present invention.
Figure 5:
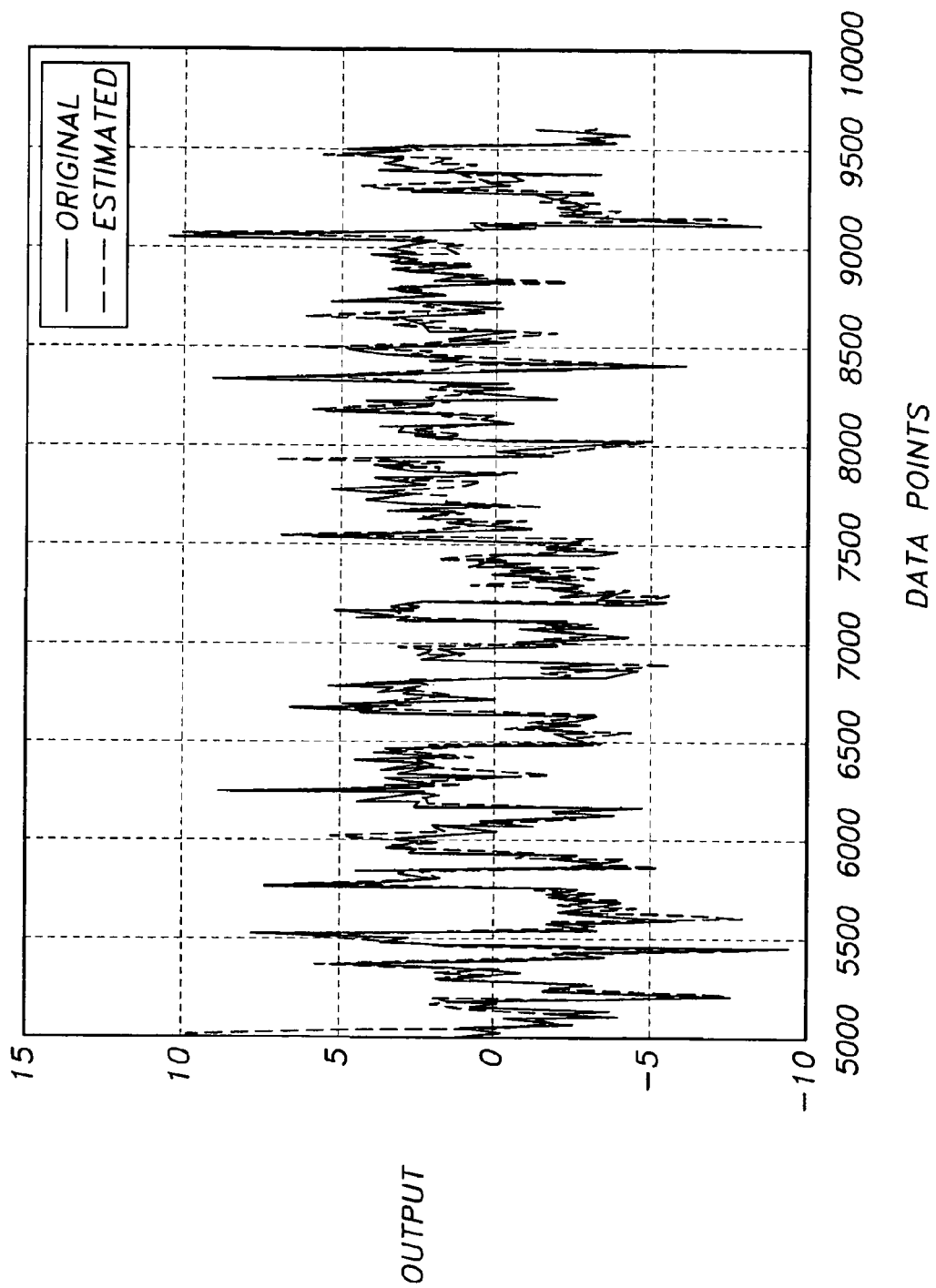
FIG. 5 is a graph illustrating measured output water level of a steam generator plant vs. predicted output drum pressure calculated by the method for Hammerstein modeling of a steam generator plant according to the present invention.
Figure 6:
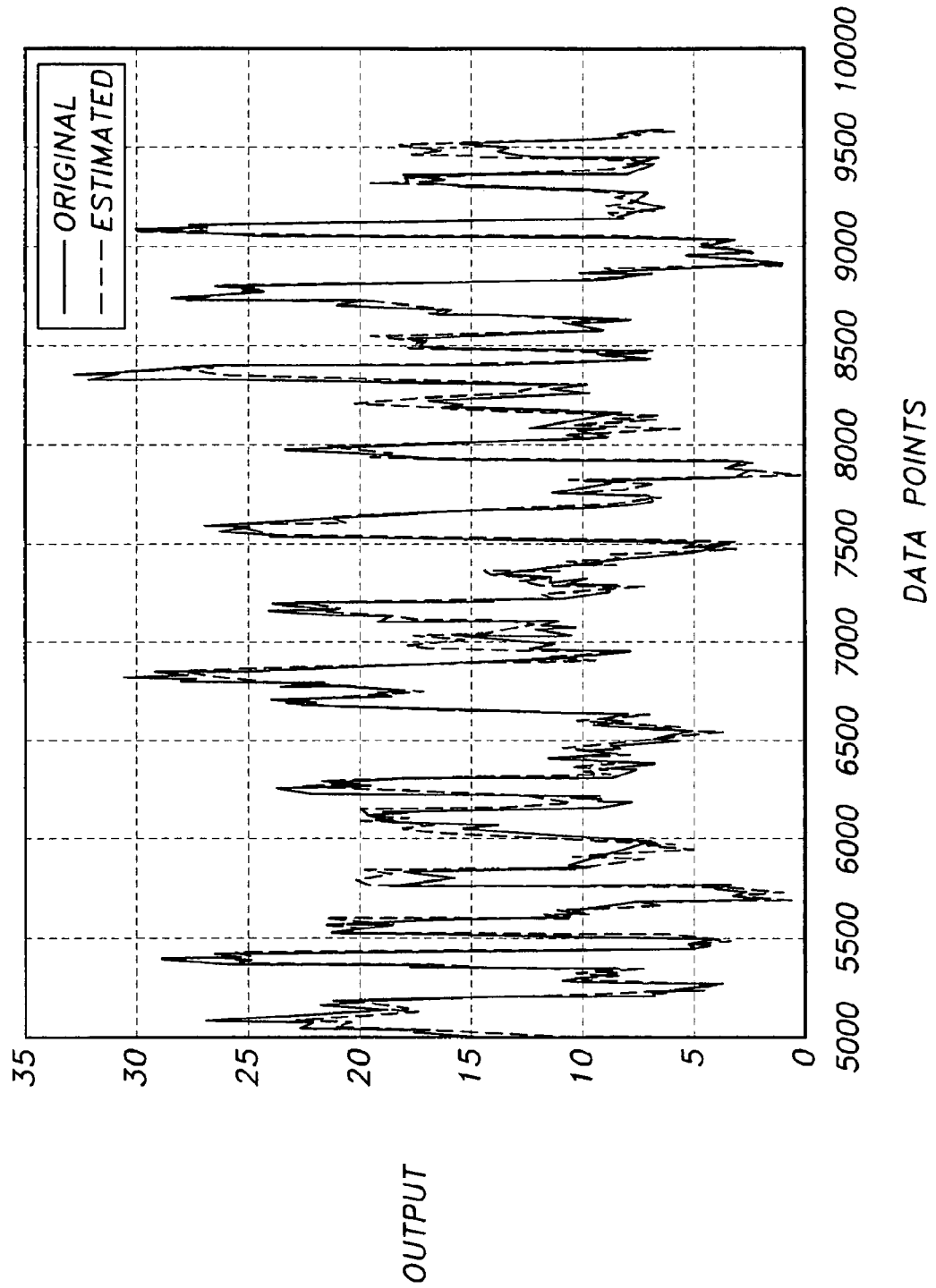
FIG. 6 is a graph illustrating measured output steam flow of a steam generator plant vs. predicted output drum pressure calculated by the method for Hammerstein modeling of a steam generator plant according to the present invention.

The model is simulated with the remaining 4,600 samples of the dataset. The results show substantial concordance with actual measured data. FIG. 3 illustrates a plot of simulated and measured drum pressure, FIG. 4 illustrates a plot of simulated and measured excess oxygen, FIG. 5 illustrates a plot of simulated and actual drum water level, and FIG. 6 illustrates a plot of simulated and measured output steam. The dynamics of the system are identified by an $8^{th}$ order state-space model.

Figure 7:
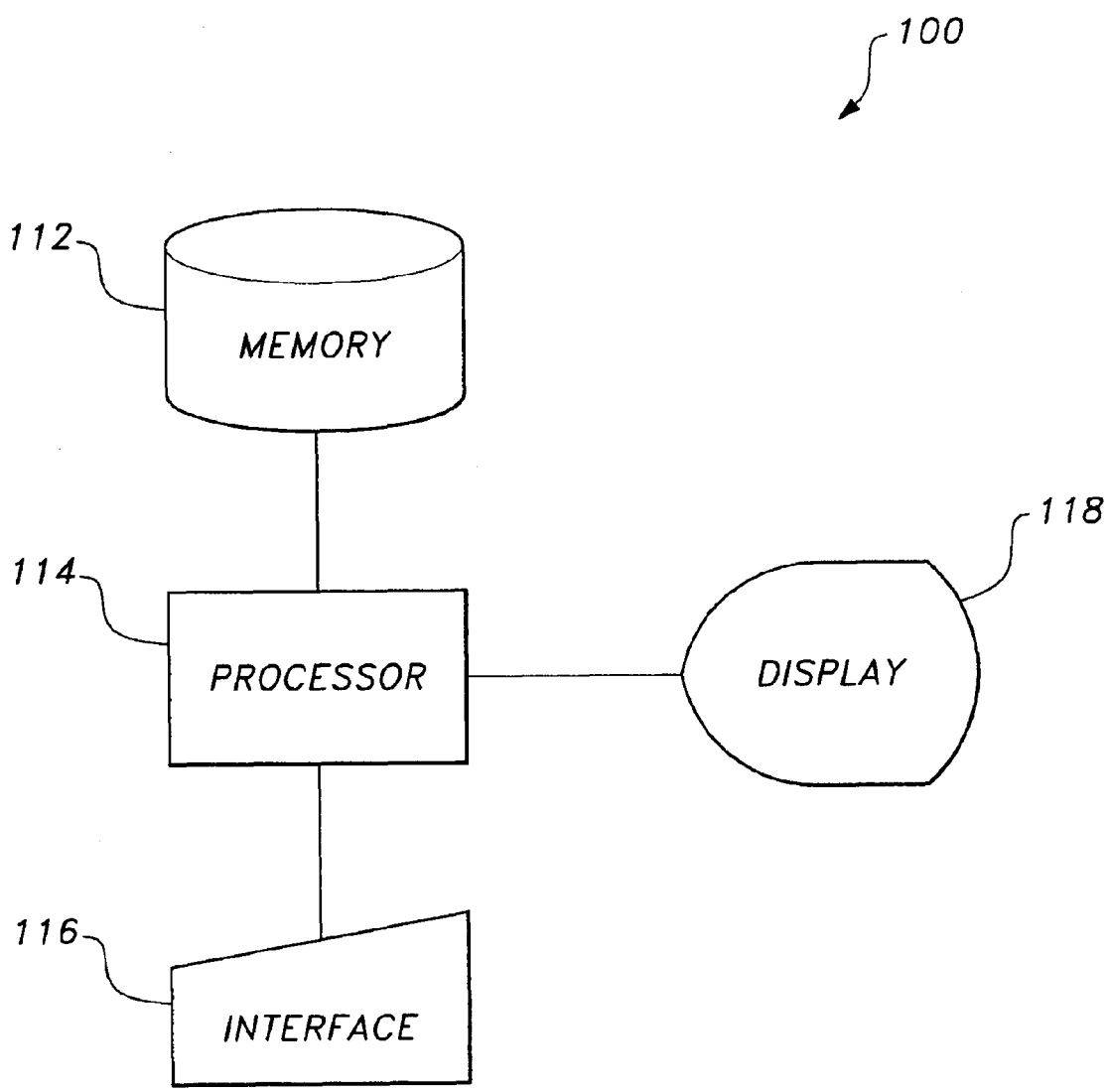
FIG. 7 is a block diagram of a computer system for implementing the method for Hammerstein modeling of a steam generator plant according to the present invention.

In the above, the calculations may be performed by any suitable computer system, such as that diagrammatically shown in FIG. 7. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method for Hammerstein modeling of a steam generator plant, comprising the steps of:
   (a) acquiring an initial set of nonlinear Hammerstein system data from a steam generation plant;
   (b) estimating a set of state-space matrices A, B, C, and D from the initial set of nonlinear Hammerstein system data acquired from the steam generation plant using subspace identification;
   (c) randomly initializing a swarm of particles with a population formed of possible radial basis function neural network weights;
   (d) calculating a global best set of weights that minimizes an output error measure;
   (e) estimating sets of radial basis function neural network outputs v(t) for all values of t based upon the global best set of weights;
   (f) estimating the state-space matrices A, B, C and D from the radial basis function neural network outputs v(t) for all values of t, estimated in step (e), and sets of original system outputs y(t) for all values of t;
   (g) calculating sets of system outputs ŷ(t) for all values of t from the estimated state-space matrices A, B, C and D of step (f);
   (h) calculating the output error measure; and
   (i) repeating steps (c) to (h) if the calculated output error measure is greater than a preselected threshhold error measure.

2. The computerized method for Hammerstein modeling of a steam generator plant as recited in claim 1, wherein the set of state-space matrices are estimated by calculating x(t+1)=

$Ax(t)+Bv(t)+s(t)$ and $\hat{y}(t)=Cx(t)+Dv(t)+z(t)$, wherein $x(t)$ represents an input of the Hammerstein system and $\hat{y}(t)$ represents an output of the Hammerstein system observed at a discrete time instant t, z(t) represents a measurement noise, and s(t) represents a process noise.

3. The computerized method for Hammerstein modeling of a steam generator plant as recited in claim 2, wherein the output error measure I is calculated as $$I = \sum_{t=1}^{N} e^T(t)e(t),$$

wherein N represents a number of noisy inputs, and e(t) is a vector for output error at discrete time instant t, where $e(t)=Y(t)-\hat{Y}(t)$.

4. The computerized method for Hammerstein modeling of a steam generator plant as recited in claim 3, wherein the radial basis function neural network outputs are calculated as $$v(t) = \sum_{i=1}^{Q} w_i \phi \| u(t) - c_i \|,$$

wherein $c_i$ represents a center for an $i^{th}$ neuron, wherein i is an integer, Q represents a number of neurons in a hidden layer of the neural network, $w_i$ represents a weight connecting the $i^{th}$ neuron node to an output layer, and $\phi$ represents a radial basis function.

5. The computerized method for Hammerstein modeling of a steam generator plant as recited in claim 4, wherein the particle swarm optimization method includes establishing a set of particles and identifying each particle in the set as a point in D-dimensional space, wherein the $i^{th}$ particle is represented as $X_i=(x_{i1},x_{i2},\ldots,x_{iD})$ and the most optimal positions of the particles are given by $P_i=(p_{i1},p_{i2},\ldots,p_{iD})$, with a change in velocity of each of the particles being given by $V_i=(v_{i1},v_{i2},\ldots,v_{iD})$, such that the velocity and position of each particle is updated as $V_i^{n+1}=w*V_i^n+c_1*r_{i1}^n*(P_i^n-X_i^n)+c_2*r_{i2}^n*(P_g^n-X_i^n)$ and $X_i^{n+1}=X_i^n+x*V_i^{n+1}$, wherein w is an inertial weight parameter for limiting velocity, and $c_1$ and $c_2$ represent a cognitive parameter and a social parameter, respectively.

6. A system for Hammerstein modeling of a steam generator plant, comprising:
a processor;
computer readable memory coupled to the processor;
a user interface coupled to the processor;
a display coupled to the processor
software stored in the memory and executable by the processor, the software having:
means for estimating a set of state-space matrices A, B, C and D from an initial set of nonlinear Hammerstein system data acquired from a plant using subspace identification;
means for initializing a swarm of particles with a random population of possible radial basis function neural network weights;
means for calculating a global best set of weights which minimizes an output error measure;
means for estimating sets of radial basis function neural network outputs v(t) for all values of t based upon the global best set of weights;
means for estimating the state-space matrices A, B, C and D from the estimated radial basis function neural network outputs, and sets of original system outputs y(t) for all values of t;
means for calculating sets of system outputs $\hat{y}(t)$ for all values of t from the estimated state-space matrices A, B, C and D; and
means for calculating the output error measure.

7. A computer software product that includes a non-transitory storage medium readable by a processor, the non-transitory storage medium having stored thereon a set of instructions for Hammerstein modeling of a steam generator plant, the instructions comprising:
(a) a first sequence of instructions which, when executed by the processor, causes the processor to provide an initial set of nonlinear Hammerstein system data, the initial set of nonlinear Hammerstein data representing data received from a steam generator plant;
(b) a second sequence of instructions which, when executed by the processor, causes the processor to estimate a set of state-space matrices A, B, C and D from the initial set of nonlinear data using subspace identification;
(c) a third sequence of instructions which, when executed by the processor, causes the processor to initialize a swarm of particles with a random population of possible radial basis function neural network weights;
(d) a fourth sequence of instructions which, when executed by the processor, causes the processor to calculate a global best set of weights which minimizes an output error measure;
(e) a fifth sequence of instructions which, when executed by the processor, causes the processor to estimate sets of radial basis function neural network outputs v(t) for all values of t based upon the global best set of weights;
(f) a sixth sequence of instructions which, when executed by the processor, causes the processor to estimate the state-space matrices A, B, C and D from the radial basis function neural network outputs estimated in the fifth set of instructions, and sets of original system outputs y(t) for all values of t;
(g) a seventh sequence of instructions which, when executed by the processor, causes the processor to calculate sets of system outputs $\hat{y}(t)$ for all values of t from the estimated state-space matrices A, B, C and D of the sixth sequence of instructions;
(h) an eighth sequence of instructions which, when executed by the processor, causes the processor to calculate the output error measure; and
(i) a ninth sequence of instructions which, when executed by the processor, causes the processor to repeat the third sequence of instructions for the eighth sequence of instructions if the calculated output error measure is greater than a preselected threshhold error measure.

* * * * *